United States Patent Office 2,726,248
Patented Dec. 6, 1955

2,726,248
3-AMINO PYRAZOLINES AND PROCESS

John David Kendall and George Frank Duffin, Ilford, England, assignors to Ilford Limited, Ilford, England, a British company No Drawing. Application May 17, 1954,
Serial No. 430,396

Claims priority, application Great Britain April 6, 1950

12 Claims. (Cl. 260—310)

This invention relates to new organic compounds and particularly to 3-aminopyrazolines and to processes for their production.

This application is a continuation-in-part of application Serial No. 217,665, filed March 26, 1951, now abandoned.

According to the present invention new organic compounds conform to the tautomeric general formulae:

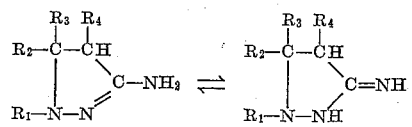

wherein $R_1$ represents a hydrogen atom, a phenyl group, or a phenyl group containing at least one nuclear substituent selected from alkyl, alkoxy, aryloxy, acylamino, arylthio and halogen groups, $R_2$ is hydrogen, alkyl or aryl, and $R_3$ and $R_4$ are the same or different and are hydrogen atoms or alkyl groups. Suitable alkyl groups are methyl, ethyl, propyl, butyl and higher alkyl groups, suitable alkoxy groups are methoxy, ethoxy, propoxy and butoxy, suitable aryloxy groups include phenoxy, suitable acylamino groups are acetamino, propionamino and higher homologous groups, suitable arylthio groups include phenylthio, and suitable halogens are chlorine and bromine. The said compounds are of value inter alia as intermediates in the production of 3-pyrazolidones which are photographic developing agents (compare co-pending application Serial No. 430,395 filed on even date herewith). As described in said co-pending application the products of the present invention may be converted to 3-pyrazolidones by acid hydrolysis.

According to a further feature of this invention the aforesaid compounds are prepared by condensing a hydrazine of the general formula $R_1NHNH_2$ with a β-alkoxy-propionitrile of the general formula:

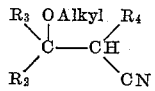

in the presence of a small quantity of alkali hydroxide or alkoxide.

It is preferred, according to this invention however, to produce the aforesaid compounds by condensing a hydrazine of the formula $R_1NH.NH_2$ with an unsaturated olefinic nitrile of the formula

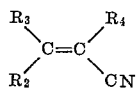

in the presence of a small quantity of alkali hydroxide or alkoxide. It is believed, though the applicants are not to be regarded as relying on this theory, that an intermediate product is first formed, conforming to the formula:

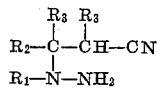

and that this ring-closes to form the required product. It is much preferred from the point of view of yield to use an alkali alkoxide in alcoholic solution. While any alkali alkoxide may be employed it is usually desirable to employ sodium ethoxide as being the most readily available of this series of substances.

The aminopyrazolines may be isolated from their reaction mixtures as the free bases, or acid may be added to their solutions so that they are converted to salts of the free bases and isolated as such.

The following examples will serve to illustrate the invention but are not to be regarded as limiting it in any way:

EXAMPLE 1
*3-amino-1-phenyl-Δ²-pyrazoline*

Phenylhydrazine (5 cc.) and β-ethoxypropionitrile (5 g.) were added to a solution of sodium (02 g.) in ethanol (20 cc.). The resulting solution was boiled under reflux for six hours, filtered hot and cooled when the product crystallised in colourless plates, M. Pt. 167°.

EXAMPLE 2
*3-amino-Δ²-pyrazoline hydrochloride*

Acrylonitrile (26 cc.) was added gradually with stirring to hydrazine hydrate (20 cc. 100% solution) at a temperature of 0° and the mixture then warmed for 30 minutes on a water bath. Water was then distilled off at a pressure of 15 mm., the residue added to a solution of sodium (1 g.) in ethanol (100 cc.) and the solution boiled under reflux for four hours. The solution was filtered, cooled to 0° and concentrated hydrochloric acid (50 cc.), S. G. 1.16 added when the product was precipitated as colourless needles, M. Pt. 196° C. The material was purified by recrystallisation from ethanol.

EXAMPLE 3
*3-amino-1-phenyl-Δ²-pyrazoline*

Acrylonitrile (27 g.) and phenylhydrazine (54 g.) were dissolved in ethanol (100 cc.) and a solution of sodium (2 g.) in ethanol (100 cc.) added. The resulting solution was boiled under reflux for four hours, filtered hot and the filtrate cooled to 0° C., when the product crystallised in almost colourless plates, M. Pt. 167° C.

This product was identical to that obtained by Example 1.

EXAMPLE 4
*3-amino-1-m-tolyl pyrazoline*

Acrylonitrile (54 g.) and m-tolylhydrazine (122 g.) were dissolved in ethanol (200 cc.) and a solution of sodium (5 g.) in ethanol (250 cc.) added. The resulting solution was boiled for five hours under reflux, filtered hot and the filtrate cooled to 0° C. when the product crystallised as almost colourless needles, M. Pt. 110° C.

EXAMPLE 5
*3-amino-1-p-tolyl pyrazoline*

Acrylonitrile (54 g.) and p-tolylhydrazine (122 g.) were dissolved in ethanol (250 cc.) and a solution of sodium (5 g.) in ethanol (250 g.) added. The resulting solution was boiled under reflux for five hours, filtered hot and the filtrate cooled to 0° C. when the product crystallised as colourless needles, M. Pt. 143° C.

EXAMPLE 6
*3-amino-4-methyl-1-phenyl-pyrazoline*

Phenylhydrazine (108 g.) and α-methyl acrylonitrile (67 g.) were added to a solution of sodium (5 g.) in ethanol (400 cc.). The solution was then boiled under reflux for six hours, filtered hot and the filtrate diluted with water (1–5 litres). The oil which was precipitated rapidly crystallised and was removed by filtration. The solid was dried and recrystallised from light petroleum yielding the product as small colourless plates, M. Pt. 82° C.

EXAMPLE 7

*3-amino-5-methyl-1-phenylpyrazoline*

Crotonitrile (67 g.) and phenylhydrazine (108 g.) were added to a solution of sodium (5.0 g.) in ethanol (400 cc.). The solution was boiled for six hours, filtered hot and the filtrate cooled to 0° C. when the product crystallised as small white needles, M. Pt. 106° C.

EXAMPLE 8

*3-amino-1: 5-diphenylpyrazoline*

Cinnamonitrile (129 g.) and phenylhydrazine (108 g.) were dissolved in ethanol (500 cc.) and a solution of sodium (5 g.) in ethanol (500 cc.) added. The resulting solution was boiled under reflux for six hours, filtered hot and cooled to 0° when the product crystallised in almost colourless needles, M. Pt. 191–2° C.

EXAMPLE 9

*3-amino-1-m-tolyl-5-phenyl pyrazoline*

Cinnamonitrile (129 g.) and m-tolylhydrazine (122 g.) were dissolved in ethanol (500 cc.) and a solution of sodium (0.5 g.) in ethanol (500 cc.) added. The solution was then boiled for five hours, filtered hot and the filtrate cooled to 0° when the product crystallised in almost colourless needles, M. Pt. 152° C.

EXAMPLE 10

*3-amino-1-p-tolyl-5-phenylpyrazoline*

Cinnamonitrile (129 g.) and p-tolylhydrazine (122 g.) were dissolved in ethanol (1 litre) and a solution of sodium (5 g.) in ethanol (500 cc.) added. The solution was then boiled for five hours under reflux, filtered hot and the filtrate cooled in ice when the product crystallised as almost colourless needles, M. Pt. 195° C.

EXAMPLE 11

*3-amino-1-o-tolylpyrazoline* o-Tolylhydrazine (6.1 g.) and acrylonitrile (5.2 cc.) were dissolved in ethanol (20 cc.) and a solution of sodium (0.5 g.) in ethanol (25 cc.) added. The solution was boiled for six hours under reflux, filtered hot, cooled and diluted with water when the product crystallised. After filtration and recrystallisation from benzene, pure 3-amino-1-o-tolylpyrazoline was obtained as colourless needles, M. Pt. 74° C.

EXAMPLE 12

*3-amino-1-p-methoxyphenyl pyrazoline*

Acrylonitrile (54 g.) and p-methoxyphenylhydrazine (138 g.) were dissolved in ethanol (500 cc.) and a solution of sodium (10 g.) in ethanol (400 cc.) added. The resulting solution was boiled for four hours under reflux, filtered hot and cooled when the product crystallised. After filtration and recrystallisation, 3-amino-1-p-methoxyphenyl pyrazoline was obtained as buff needles, M. Pt. 179–180° C.

EXAMPLE 13

*3-amino-1-p-acetaminophenylpyrazoline* p-Acetaminophenylhydrazine hydrochloride (22.0 g.) was boiled with a solution of sodium (4.0 g.) in ethanol (100 cc.) for 30 minutes and acrylonitrile (7.1 cc.) added. The resulting mixture was boiled for three hours, diluted with water and neutralised by adding acetic acid. The ethanol was then distilled off when the product crystallised as colourless leaflets; recrystallisation from benzene-ethanol gave the pure product as colourless microcrystals, M. Pt. 204°.

EXAMPLE 14

*3-amino-1-p-methoxyphenyl-5-phenyl-$\Delta^2$-pyrazoline*

Sodium (2.0 g.) was dissolved in ethanol (50 cc.) and p-methoxyphenylhydrazine (10.8 g.) and cinnamonitrile (10 g.) added to the solution. After boiling under reflux all night, the mixture was cooled, the precipitated solid filtered off and recrystallised from benzene to yield the pure amine as buff needles, M. Pt. 148°.

EXAMPLE 15

*3-amino-1-p-phenoxyphenyl-$\Delta^2$-pyrazoline*

Sodium (0.46 g.) was dissolved in ethanol (23 cc.) and p-phenoxyphenylhydrazine (18.4 g.) and acrylonitrile (6 cc.) added to the solution. After boiling under reflux for 24 hours, the solution was cooled to precipitate a crystalline mass. The solid was filtered off and recrystallised from ethanol to give the pure amine as buff plates, M. Pt. 147°.

EXAMPLE 16

*3-amino-1-p-chlorophenyl-5-phenyl-$\Delta^2$-pyrazoline*

Sodium (0.05 g.) was dissolved in ethanol (5 cc.) and a solution of p-chlorophenylhydrazine (2.75 g.) and cinnamonitrile (2.5 g.) in ethanol (10 cc.) added to it. After refluxing the mixture for four hours, it was cooled, the resulting crystalline mass filtered off and recrystallised from ethanol to yield the pure amine as colourless needles, M. Pt. 129°.

EXAMPLE 17

*3-amino-5: 5-dimethyl-1-phenyl-$\Delta^2$-pyrazoline*

Sodium (1.0 g.) was dissolved in ethanol (50 cc.) and $\beta:\beta$-dimethylacrylonitrile (13.8 g.) and phenylhydrazine (18.3 g.) added to the solution. After boiling under reflux for 20 hours, the mixture was diluted with water (200 cc.) to precipitate a crystalline mass. The solid was filtered off and recrystallised from water to yield the pure amine as colourless plates, M. Pt. 172°.

EXAMPLE 18

*3-amino-1-p-chlorophenyl-$\Delta^2$-pyrazoline*

Sodium (0.5 g.) was dissolved in ethanol (25 cc.) and p-chlorophenylhydrazine (14.5 g.) and acrylonitrile (6.5 cc.) added to the resulting solution. After boiling under reflux for five hours, the solution was cooled and the precipitated crystalline mass filtered off. Recrystallisation from ethanol yielded the pure amine as colourless needles, M. Pt. 135°.

EXAMPLE 19

*3-amino-1-p-bromophenyl-$\Delta^2$-pyrazoline*

Sodium (0.7 g.) was dissolved in ethanol (35 cc.) and p-bromophenylhydrazine (24 g.) and acrylonitrile (8.6 cc.) added to the resulting solution. After boiling for six hours, the solution was cooled to precipitate a crystalline mass. After filtration, the solid was recrystallised from ethanol to give the product as colourless needles, M. Pt. 121°.

EXAMPLE 20

*3-amino-1-2': 5'-dimethylphenyl-$\Delta^2$-pyrazoline*

Sodium (0.8 g.) was dissolved in ethanol (48 cc.) and 2:5-dimethylphenylhydrazine (22 g.) and acrylonitrile (10.5 cc.) added to the solution. After boiling under reflux for four hours, the solution was cooled and diluted with water (100 cc.). A crystalline mass was slowly deposited which was filtered off and recrystallised from benzene to give the pure amine as colourless needles, M. Pt. 99°.

EXAMPLE 21

*3-amino-1-m-chlorophenyl-$\Delta^2$-pyrazoline*

Sodium (0.3 g.) was dissolved in ethanol (16.5 cc.) and m-chlorophenylhydrazine (8 g.) and acrylonitrile (3.7 cc.) added to the solution. After refluxing for four hours, the solution was cooled to precipitate a crystalline solid. This solid was filtered off and recrystallised from ethanol to yield the pure amine as colourless needles, M. Pt. 142°.

EXAMPLE 22

*3-amino-1-p-ethoxyphenyl-Δ²-pyrazoline*

Sodium (0.3 g.) was dissolved in ethanol (14.7 cc.) and p-ethoxyphenylhydrazine (9.2 g.) and acrylonitrile (3.9 cc.) added to the solution. After boiling under reflux for six hours, the mixture was diluted with water (50 cc.) to precipitate a crystalline solid. This solid was filtered off and recrystallised from benzene to give the pure amine as buff microneedles, M. Pt. 192°.

EXAMPLE 23

*3-amino-1-p-p'-tolylthiophenyl-Δ²-pyrazoline*

Sodium (0.45 g.) was dissolved in ethanol (20 cc.) and p-p'-tolylthiophenylhydrazine (18.6 g.) and acrylonitrile (5.25 cc.) added to the solution. After boiling under reflux for 24 hours, the mixture was cooled, the resulting crystalline precipitate filtered off and recrystallised from benzene to yield the pure amine as buff microneedles, M. Pt. 123°.

EXAMPLE 24

*3-amino-4-ethyl-1-phenyl-Δ²-pyrazoline*

Sodium (1.0 g.) was dissolved in ethanol (50 cc.) and phenylhydrazine (20 cc.) and α-ethylacrylonitrile (16.3 g.) added to the solution. The mixture was boiled under reflux for six hours and then diluted with water (100 cc.) to precipitate an oil which, after cooling for some time, became solid. The solid was filtered and recrystallised from petroleum ether (60–80) to yield the pure amine as colourless needles, M. Pt. 80°.

p-Phenoxyphenylhydrazine hydrochloride was obtained from p-aminodiphenylether (Ber. 29, 1449) by the well known method of reducing the diazonium chloride, prepared from the amine, with stannous chloride. The free hydrazine was obtained by adding alkali to the hydrochloride obtained from the reduction and extracting with benzene, and was used without purification.

p-p'-Tolylthiophenylhydrazine was obtained by an exactly similar process from p-p'-tolylthioaniline (Ber. 61, 844) and was also used without purification.

All the other starting materials used in the foregoing examples are described in the literature.

What we claim is:

1. A compound conforming to the tautomeric general formulae:

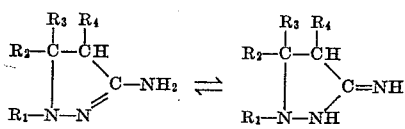

where R₁ is selected from the class consisting of the hydrogen atom, phenyl, lower alkylphenyl, lower alkoxyphenyl, lower alkyl carboxylic acylaminophenyl and halogenophenyl groups; R₂ is selected from the class consisting of the hydrogen atom, lower alkyl and phenyl groups and R₃ and R₄ are each selected from the class consisting of the hydrogen atom and lower alkyl groups.

2. The compound 3-amino-1-phenyl-Δ²-pyrazoline.

3. The compound 3-amino-4-methyl-1-phenyl-Δ²-pyrazoline.

4. The compound 3-amino-5-methyl-1-phenyl-Δ²-pyrazoline.

5. The compound 3-amino-1-p-acetaminophenyl-Δ²-pyrazoline.

6. The compound 3-amino-1-p-methoxyphenyl-Δ²-pyrazoline.

7. A process for the production of a compound conforming to the tautomeric general formulae:

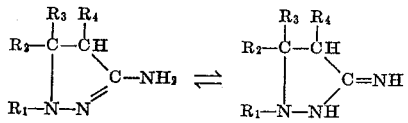

wherein R₁ is selected from the class consisting of the hydrogen atom, phenyl, lower alkylphenyl, lower alkoxyphenyl, lower alkyl carboxylic acylaminophenyl, and halogenphenyl groups; R₂ is selected from the class consisting of the hydrogen atom, lower alkyl and phenyl groups and R₃ and R₄ are each selected from the class consisting of the hydrogen atom and lower alkyl groups; which comprises heating a hydrazine of the formula R₁NH.NH₂ with a compound selected from the class consisting of (a) an unsaturated olefinic nitrile of the formula:

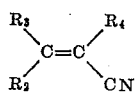

and (b) a β-alkoxypropionitrile of the formula:

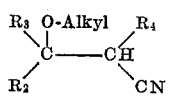

in the presence of a compound selected from the class consisting of alkali alkoxides and hydroxides.

8. A process for the production of 3-amino-1-p-acetaminophenyl-Δ²-pyrazoline which comprises heating p-acetaminophenylhydrazine hydrochloride with acrylonitrile in the presence of an ethanolic solution of sodium ethoxide.

9. A process for the production of 3-amino-1-p-methoxy-phenyl-Δ²-pyrazoline which comprises heating p-methoxyphenylhydrazine with acrylonitrile in the presence of an ethanolic solution of sodium ethoxide.

10. Process for the production of 3-amino-1-phenyl-Δ²-pyrazoline which comprises heating phenyl hydrazine with acrylonitrile in the presence of an ethanolic solution of sodium ethoxide.

11. Process for the production of 3-amino-4-methyl-1-phenyl-Δ²-pyrazoline which comprises heating phenyl hydrazine with α-methyl acrylonitrile in the presence of an ethanolic solution of sodium ethoxide.

12. Process for the production of 3-amino-5-methyl-1-phenyl-Δ²-pyrazoline which comprises heating phenyl hydrazine with crotonitrile in the presence of an ethanolic solution of sodium ethoxide.

References Cited in the file of this patent

UNITED STATES PATENTS

| | | |
|---|---|---|
| 2,367,523 | Porter et al. | Jan. 16, 1945 |
| 2,376,380 | Porter et al. | May 22, 1945 |
| 2,688,024 | Kendall et al. | Aug. 31, 1954 |

FOREIGN PATENTS

| | | |
|---|---|---|
| 679,678 | Great Britain | Sept. 24, 1952 |